Nov. 12, 1935. J. L. SOCKWELL 2,021,109
ANTITHEFT BOLT LOCK CONSTRUCTION
Filed July 2, 1934

Inventor
J. L. Sockwell,
By a. Ponack
Attorney

Patented Nov. 12, 1935

2,021,109

UNITED STATES PATENT OFFICE 2,021,109

ANTITHEFT BOLT LOCK CONSTRUCTION

James L. Sockwell, Jacksonville, Fla., assignor of one-half to Jesse N. Boatright, Jacksonville, Fla.

Application July 2, 1934, Serial No. 733,501

3 Claims. (Cl. 85—36)

The present invention relates, generically, to a novel bolt lock construction. More specifically, the invention has especial relation to a construction which may more particularly be described as an automobile license plate anti-theft lock. While this constitutes a preferred application of the invention, it is nevertheless to be understood that the invention is of general application, and the scope thereof is not to be limited by the details of the following detailed disclosure nor otherwise than by the terms of the claims hereunto appended.

A primary object of the present invention is the provision of an uncomplicated, but nevertheless highly efficient, bolt lock construction, wherein the locking element proper is concealed from ready view and access. Another object of this invention is to provide a construction of the character aforesaid, which shall comprise a minimum of parts and which, consequently, shall be economical to manufacture. Still a further object of the invention is to provide a bolt lock construction of the type outlined, which shall be particularly adapted to function as an anti-theft lock for automobile license plates, the arrangement and relationship of parts being such as to make it impossible to remove such plates from their support without involving mutilation of the lock and necessitating operations on the part of the thief which are bound to attract attention to the unusual character thereof.

The foregoing and other objects, which will be apparent from the present specification to those skilled in the art to which the present invention pertains, are attained by the construction herein disclosed consisting essentially of a suitable headed bolt provided, along the shank thereof, with a number of spaced annular depressions; a sleeve nut adapted to be mounted on the bolt; a ferrule adapted to be housed within the sleeve nut; and a jam nut for the purpose of deforming the ferrule into the said annular grooves.

In order that the novel characteristics of the present invention may more readily be understood, the following detailed description thereof is made with reference to the accompanying sheet of drawings illustrating an exemplary embodiment of the invention.

On the said sheet of drawings:

Fig. 1 indicates portions of an automobile license plate, a support therefor, and a lock bolt, according to the present invention.

Fig. 4 is a view similar to Fig. 3, showing the parts subsequent to deformation of the said ferrule, while

Similar reference characters designate corresponding parts throughout the several figures of drawing.

Figure 1:
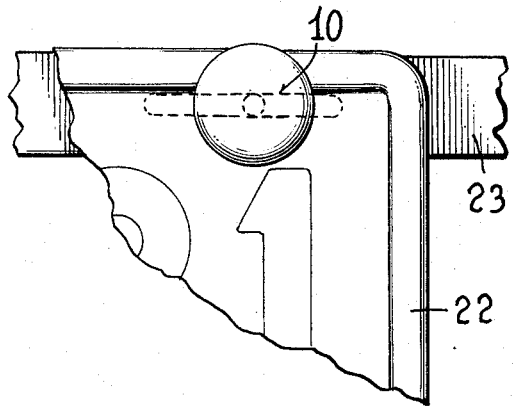

The preferred and illustrated embodiment of the invention involves a bolt member comprising a head portion 10 and a shank portion 11. The latter is provided with a plurality of suitably spaced annular grooves or the like 12 arranged transversely of the shank and forming depressions peripherally of the latter. The bolt is preferably made of hard steel.

In addition to the aforedescribed bolt, the device comprises a sleeve nut 13, a ferrule 14, and a jam nut 15.

Figure 6:
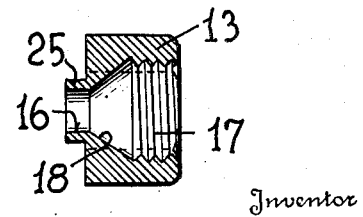
Fig. 6 is a cross section through the sleeve nut per se.

Sleeve nut 13 is preferably made of hard steel and is bored to provide a reduced bore 16—slightly greater in diameter than the diameter of shank portion 11—at one end thereof; an enlarged and interiorly threaded bore at the other end thereof, indicated at 17; and an intermediate bore or seat forming portion 18, which flares outwardly from the terminus of bore 16 to the terminus of bore 17; (see, more particularly, Figs. 3, 4 and 6).

Ferrule 14 is preferably formed of deformable brass or soft steel, and is provided with a longitudinal bore 19 of a diameter substantially like that of bore 16. Ferrule 14 is of a special exterior configuration which may be described as double frustoconical in character, the bases of the cone frustums being adjacent each other. However, the ferrule is preferably made in one piece. The inclination of the exterior inclined surfaces of the ferrule 14 preferably is such as to enable the latter to be received within the bores 17 and 18 of sleeve nut 13 with bore 18 in substantial contact with the adjacent surface 20 of ferrule 14.

Jam nut 15 is preferably made of hard steel or the like so that threaded portions thereof will not strip easily. The nut 15 comprises a head portion and an exteriorly threaded shank portion adapted to be screwed into the threaded bore 17 of sleeve nut 13. Nut 15 is bored centrally and longitudinally thereof, the diameter of the bore being substantially greater than the diameter of the shank 11 and of such size, specifically, that the inner rounded edge 21 of such bore is adapted to be applied to an intermediate portion of the juxtaposed surface 20 of ferrule 14, when the device is being assembled.

Figure 2:
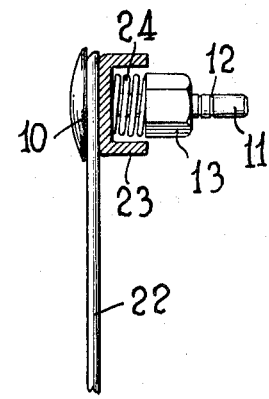
Fig. 2 is a side view of the parts shown in Fig. 1.
Figure 3:
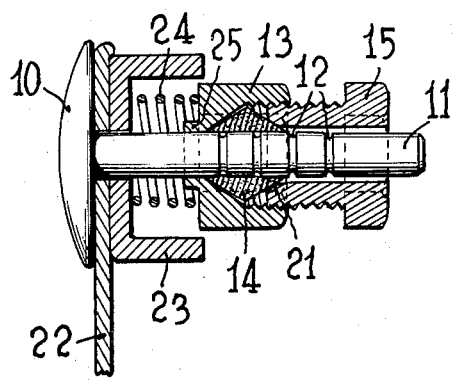
Fig. 3 is a view, partly in section and partly in side elevation, showing the essential features of the invention prior to deformation of the locking ferrule.
Figure 4:
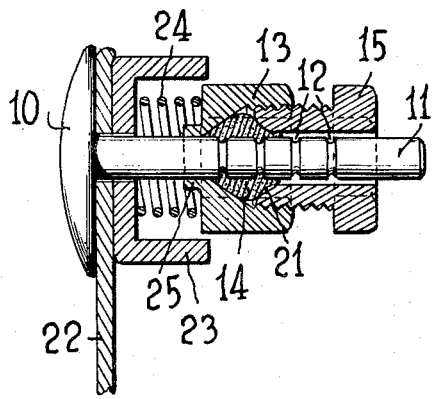
Figure 5:
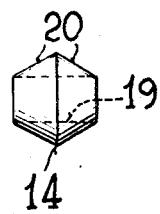
Fig. 5 is an elevational view of the ferrule per se.

Using the illustrated application of the invention as an automobile license plate anti-theft lock as a convenient medium for indicating the manner in which the device is employed, the method of use and operation is as follows:

The license plate 22 is mounted on the license plate bracket 23 by means of a pair of bolts aforedescribed, substantially in the manner indicated in Fig. 1. A sleeve nut 13 is then slid over the end of each bolt, the latter having been pushed or drawn through the usual holes in the license plate and bracket. The sleeve nuts may be pushed firmly against the bracket, or into contact with a spring disposed as shown in Figs. 2, 3 and 4 between the sleeve nut and the bracket, said spring, indicated at 24, functioning to retain the license plate against rattling. If spring 24 is used, a spring seat or shoulder 25 may be provided on sleeve 13 adjacent bore 16. Ferrules 14 (one to each bolt) are then slid down over the exposed ends of the two bolts and down snugly into the sleeve nuts. Jam nuts 15 are then screwed firmly into the sleeve nuts 13, whereupon end 21 is pressed down and over the adjacent portion of the ferrule 14 and the latter is deformed into the adjacent groove or grooves 12, which may extend along the entire length of the shank 11 or only along predetermined portions thereof, thereby securely locking the license plate to the bracket of the automobile. By firmly screwing the jam nuts 15 into sleeve nuts 13, using a wrench on the polygonal exteriors thereof, both ends of the ferrules 14 will be pressed into grooves on the shank bolts, as shown in Fig. 4. Jam nuts 15 may then be removed so that the final arrangement will have the appearance indicated in Fig. 2.

It is evident, of course, that the device will operate in substantially the same manner to lock devices other than license plates.

An advantage of the construction of the present invention is that the bolt need not be threaded. By providing one or two grooves at the predetermined portion of the shank, the lock will be concealed and the character thereof will not be discernible from the exterior.

An important feature of the invention is the exterior configuration of the locking ferrule. The inclined surface which cooperates with rounded end 21 causes the component of the force exerted by the latter to be of increased magnitude in a direction normal to the axis of shank 11, thus increasing the mechanical efficiency of the arrangement. Moreover, both surfaces 20 are substantially identical so that either may equally well cooperate with seat 18 or end 21.

Having described the invention and exemplified it by means of a preferred embodiment thereof, what is claimed and desired to protect by Letters Patent is:

1. A bolt lock assembly particularly adapted to constitute an automobile license plate anti-theft lock, said assembly comprising a license plate retaining bolt provided with spaced depressions in the shank surface thereof, a sleeve nut slidably mounted on said bolt, said sleeve nut being provided with a substantially central bore, part of which is threaded and the remainder of which is unthreaded, and readily deformable means adapted to be housed in said unthreaded part of said bore of said sleeve nut and deformed into intimate contact with the interior surface of said sleeve nut bore and into one or more of said depressions, and jam means for effecting said deformation, said jam means being removably threaded into the threaded part of said bore and comprising a convexly arcuate pressure-applying surface.

2. A bolt lock assembly particularly adapted to constitute an automobile license plate anti-theft lock, said assembly consisting of a shanked bolt, said bolt being provided with a plurality of spaced annular grooves extending around the shank surface thereof, a sleeve nut mounted on said shank adjacent certain of said grooves, said nut being provided with a bore extending axially therethrough, said bore comprising an enlarged threaded end portion and an intermediate flared seat portion, a double frustoconical ferrule made of relatively soft deformable metal arranged within said sleeve nut with a portion of the surface thereof in substantial contact with said seat portion and other portions thereof projecting into said grooves, said enlarged threaded portion being adapted to receive a jam nut adapted to effect deformation of said ferrule and thereafter to be removed, whereby said ferrule is concealed from ready view and access.

3. A bolt lock assembly of the character described particularly adapted to constitute an automobile license plate anti-theft lock, said assembly consisting of a bolt having a head and a shank, said shank being provided with a recess in the surface thereof, a sleeve nut mounted on said shank adjacent said recess, a deformable metallic ferrule interposed between said nut and shank, the bore of said nut comprising a reduced end portion, an enlarged end portion, and an intermediate flared portion, said ferrule being positioned substantially within said intermediate portion, and being in intimate contact with the surface of the latter and of said recess, whereby it is concealed from ready view and access.

JAMES L. SOCKWELL.